US009888521B2

(12) United States Patent
Yerrabommanahalli et al.

(10) Patent No.: US 9,888,521 B2
(45) Date of Patent: Feb. 6, 2018

(54) METHOD FOR IMPLEMENTING SPECIFIC TERMINATION CAUSE CODES IN TERMINATION REQUESTS

(71) Applicant: Apple Inc., Cupertino, CA (US)

(72) Inventors: Vikram B. Yerrabommanahalli, Sunnyvale, CA (US); Abhishek Sen, San Jose, CA (US); Madhusudan Chaudhary, Campbell, CA (US); Prashant H. Vashi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 14/791,520

(22) Filed: Jul. 6, 2015

(65) Prior Publication Data

US 2015/0327326 A1 Nov. 12, 2015

Related U.S. Application Data

(63) Continuation of application No. 13/631,217, filed on Sep. 28, 2012, now Pat. No. 9,084,268.

(60) Provisional application No. 61/639,714, filed on Apr. 27, 2012.

(51) Int. Cl.
*H04W 76/06* (2009.01)
*H04M 15/00* (2006.01)
*H04W 4/24* (2009.01)

(52) U.S. Cl.
CPC ....... *H04W 76/064* (2013.01); *H04M 15/886* (2013.01); *H04W 4/24* (2013.01); *H04W 76/062* (2013.01)

(58) Field of Classification Search
None
See application file for complete search history.

(56) References Cited

U.S. PATENT DOCUMENTS

| 7,633,910 | B2* | 12/2009 | Zhun | H04W 36/18 370/310 |
|---|---|---|---|---|
| 8,548,433 | B1 | 10/2013 | Othmer et al. | |
| 8,706,138 | B2 | 4/2014 | Cheng | |
| 9,084,268 | B2* | 7/2015 | Yerrabommanahalli | H04W 76/062 |
| 2003/0061170 | A1 | 3/2003 | Uzo | |
| 2004/0148263 | A1 | 7/2004 | Lialiamou et al. | |
| 2005/0043028 | A1 | 2/2005 | Suomi | |
| 2006/0227731 | A1* | 10/2006 | Shun | H04W 36/18 370/310 |

(Continued)

*Primary Examiner* — Robert C Scheibel
(74) *Attorney, Agent, or Firm* — Meyertons, Hood, Kivlin, Kowert & Goetzel, P.C.

(57) ABSTRACT

A method includes a wireless mobile device communicating with a wireless network via an evolved high rate packet data (eHRPD) interface. The wireless mobile device may receive a vendor specific network control protocol (VSNCP) packet such as a terminate-request packet, for example, that indicates the wireless network has requested a PDN disconnection. The VSNCP packet includes a cause code that indicates a reason for the PDN disconnection request. The wireless device may use the cause code to determine the reason for the PDN disconnection request. Accordingly, in response to receiving the VSNCP packet, the wireless mobile device may perform one or more operations in an effort to resolve any issues that may have caused the PDN disconnection request.

20 Claims, 6 Drawing Sheets

(56) References Cited

U.S. PATENT DOCUMENTS

| | | | |
|---|---|---|---|
| 2007/0105539 A1* | 5/2007 | Semper | H04W 76/064 455/418 |
| 2010/0003921 A1* | 1/2010 | Godlewski | H04W 76/062 455/67.11 |
| 2010/0027448 A1* | 2/2010 | Puthiyandyil | H04W 76/025 370/310 |
| 2010/0043028 A1 | 2/2010 | Puthiyandyil et al. | |
| 2010/0323696 A1 | 12/2010 | Cherian et al. | |
| 2011/0176426 A1* | 7/2011 | Lioy | H04W 76/04 370/241 |
| 2011/0213897 A1* | 9/2011 | Zhao | H04W 76/02 709/248 |
| 2011/0243053 A1* | 10/2011 | Tinnakornsrisuphap | H04L 12/189 370/312 |
| 2011/0286340 A1* | 11/2011 | Janecek | H04L 1/0036 370/252 |
| 2011/0317545 A1* | 12/2011 | Tiwari | H04W 4/22 370/216 |
| 2012/0127956 A1* | 5/2012 | Wang | H04W 36/0033 370/331 |
| 2012/0155296 A1* | 6/2012 | Kashanian | H04L 12/1417 370/252 |
| 2012/0188980 A1* | 7/2012 | Wang | H04W 36/0033 370/331 |
| 2012/0198081 A1 | 8/2012 | Zhao et al. | |
| 2012/0275312 A1* | 11/2012 | Cormier | H04W 4/20 370/241 |
| 2013/0100795 A1* | 4/2013 | Zhao | H04W 36/0016 370/216 |

* cited by examiner

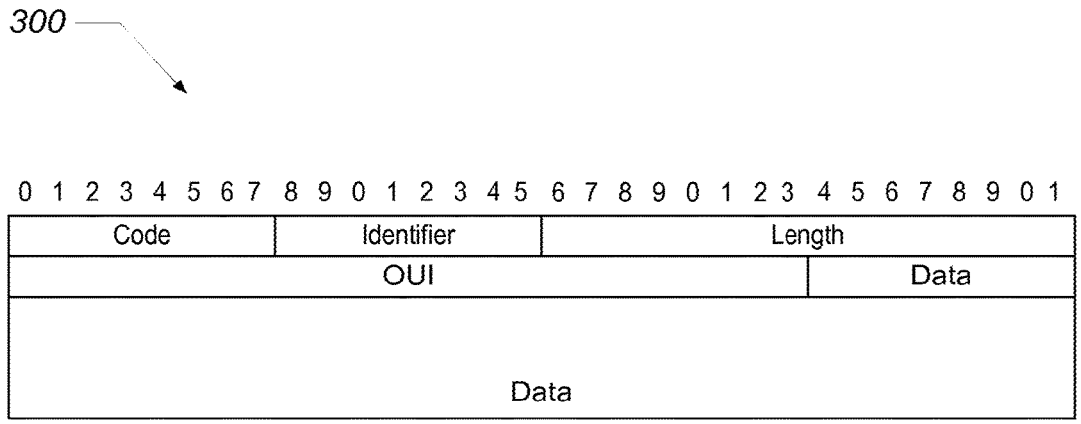

Legend:

Code    1 through 7 (VSNCP Configure-Request, VSNCP Configure-Ack, VSNCP Configure-Nak, VSNCP Configure-Reject, VSNCP Terminate-Request, VSNCP Terminate-Ack, and VSNCP Code-Reject) as defined in RFC 3772 [58].

Note: Code '3' (VSNCP Configure-Nak) is not specified for the 3GPP2 VSNCP protocol. The UE/HSGW receiving a 3GPP2 VSNCP packet with Code field set to '3' shall respond with a 3GPP2 VSNCP Code-Reject (Code '6') packet.

Identifier    As defined in RFC 3772 [58] and RFC 1661 [36].

Length    As defined in RFC 3772 [58] and RFC 1661 [36].

OUI    0xCF0002

Data    Zero or more configuration options

*FIG. 3*

METHOD FOR IMPLEMENTING SPECIFIC TERMINATION CAUSE CODES IN TERMINATION REQUESTS

PRIORITY CLAIM

The present application is a continuation of U.S. patent application Ser. No. 13/631,217, now U.S. Pat. No. 9,084,268, entitled "Method for Implementing Specific Termination Cause Codes in Termination Requests," filed Sep. 28, 2012, which claims benefit of priority to U.S. Provisional Application No. 61/639,714 entitled "Method for Implementing Specific Termination Cause Codes in Termination Requests" and filed on Apr. 27, 2012, whose inventors are Abhishek Sen, Madhusudan Chaudhary, Vikram B. Yerrabommanahalli, and Prashant H. Vashi, and which are hereby incorporated by reference in their entirety.

BACKGROUND

Technical Field

This disclosure relates to wireless communication systems and devices, and more particularly to termination cause codes and wireless device responses to them.

Description of the Related Art

Wireless networks continue to evolve as new communication technologies develop and standardize. Wireless network operators can deploy new communication technologies in parallel with earlier generation communication technologies, and wireless networks can support multiple communication technologies simultaneously to provide smooth transitions through multiple generations of mobile wireless devices. A representative wireless network may include simultaneous support for the $3^{rd}$ Generation Partnership Project (3GPP) Long Term Evolution (LTE) wireless communication standard (which may be referred to as a $4^{th}$ generation (4G) network) as well as other 3GPP, and 3GPP2 wireless communication standards such as the Enhanced High Rate Packet Data (eHRPD), for example. The 3GPP wireless communications standards organization develops mobile communication standards that include releases for Global System for Mobile Communications (GSM), General Packet Radio Service (GPRS), Universal Mobile Telecommunications System (UMTS), Long Term Evolution (LTE) and LTE Advanced standards, while the 3GPP2 wireless communications standards organization develops mobile communication standards that include CDMA2000 1×RTT and 1×EV-DO, and eHRPD standards.

When a mobile wireless device is participating in a data session or data call, and the call is terminated by a party other than the mobile device, the mobile device typically receives a termination request. Depending on the wireless communication standard according to which the mobile device may be operating, the mobile device may or may not know the cause of the termination and subsequent tear down. This can be problematic, and at the very least may cause unnecessary and unacceptable retries to re-establish the data call.

SUMMARY OF THE EMBODIMENTS

Various embodiments of a method for implementing specific termination cause codes in termination requests are disclosed. Broadly speaking, a method is contemplated in which a wireless mobile device may be communicating with a wireless network through a packet data network (PDN) connection via an evolved high rate packet data (eHRPD) interface. During the PDN connection, the wireless mobile device may receive a vendor specific network control protocol (VSNCP) packet that indicates the wireless network has requested a PDN disconnection. For example, the VSNCP packet may correspond to a VSNCP terminate-request packet. The VSNCP packet includes a cause code that indicates a reason for the PDN disconnection request. The wireless device may use the cause code to determine the reason for the PDN disconnection request. Accordingly, in response to receiving the VSNCP packet, the wireless mobile device may perform one or more operations in an effort to resolve any issues that may have caused the PDN disconnection request.

BRIEF DESCRIPTION OF THE DRAWINGS

FIG. 3 is a diagram of one embodiment of a VSNCP packet.

Figure 1:
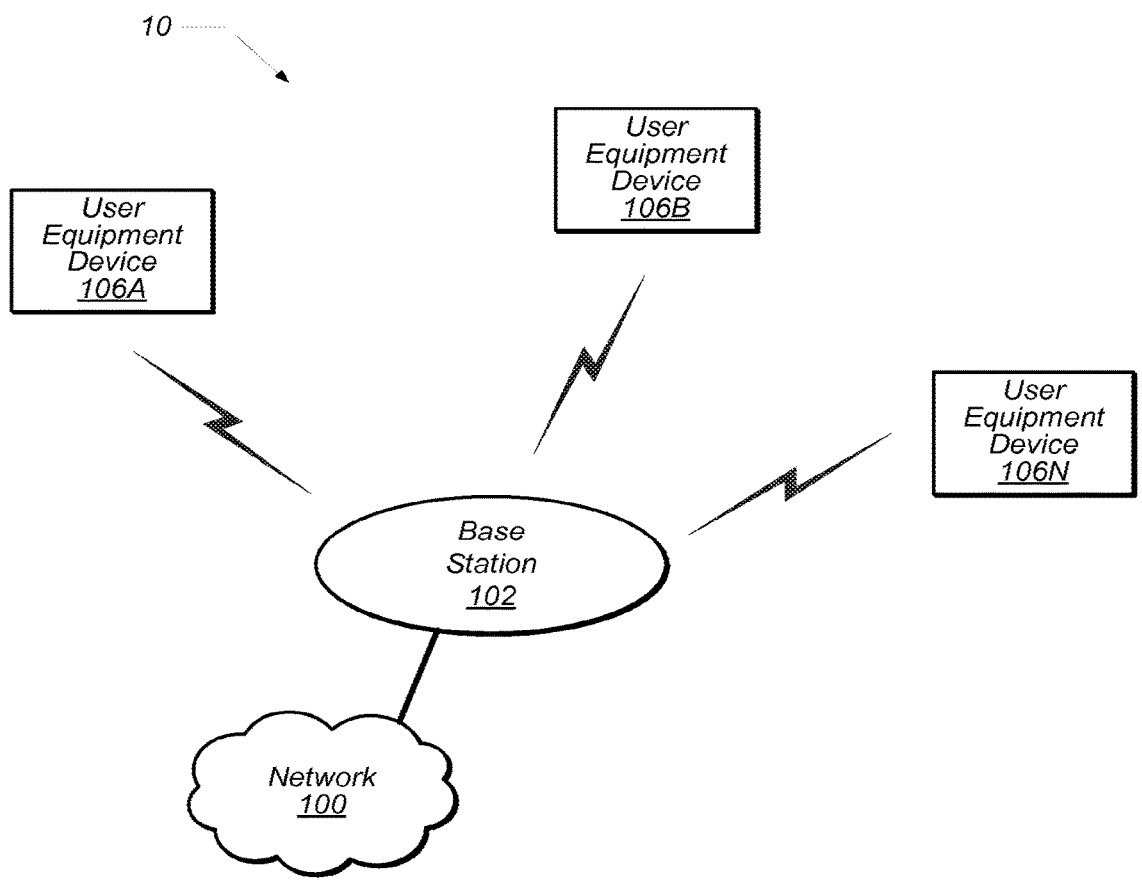
FIG. 1 is a block diagram of one embodiment of a wireless communication system.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein.

Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

As mentioned above, when participating in a data call according to some wireless communication standards, the wireless device may not receive a termination cause with a termination request. More particularly, when communicating with a network according to the eHRPD standard, the wireless mobile device may receive a vendor specific network control protocol (VSNCP) packet that includes a termination request. However, the VSNCP packet does not include a termination cause code. Thus, the wireless mobile device does not know whether to retry immediately, wait for some back off time to retry, accept the tear down and give up the data call, or accept the data call tear down and close the connection.

Thus to more efficiently manage wireless device operation in response to a termination request, in the following embodiments of FIG. 1 through FIG. 5, a wireless communication system and device are described in which a wireless device may be notified of the termination cause. In response, the wireless device may respond in a variety of ways depending on the termination cause. Similarly, as shown in FIG. 6 the wireless device may initiate a termination request, and the network may be notified of the termination cause.

Turning now to FIG. 1, a block diagram of one embodiment of a wireless communication system is shown. It is noted that the system of FIG. 1 is merely one example of any of a variety of wireless communication systems. The wireless communication system 10 includes a base station 102 which communicates over a wireless transmission medium (e.g., over the air interface) (as indicated by the zig-zag) with one or more user equipment (UE) devices (e.g., 106A through 106N). The base station 102 is also coupled a network 100 via another interface, which may be wired or wireless. It is noted that components identified by reference designators that include both a number and a letter may be referred to by the number only where appropriate.

The base station 102 may be a base transceiver station (BTS) or cell site, and may include hardware that enables wireless communication with one or more of the UEs 106. The base station 102 may also be equipped to communicate with the network 100. Thus, the base station 102 may facilitate communication between the UEs 106 and/or between the UEs 106 and the network 100. The communication area (or coverage area) of the base station 102 may be referred to as a "cell." In various embodiments, the base station 102 and the UEs may be configured to communicate over the transmission medium using any of various wireless communication radio access technologies such as LTE, eHRPD, GSM, CDMA, WLL, WAN, WiFi, WiMAX, etc. In embodiments that communicate using the eHRPD standard, the BTS 102 may be referred to as an HRPD BTS, and the network 100 may include an eAN/ePCF and a number of gateways including HRPD gateway (HSGW), a PDN gateway (P-GW), and a number of policy and packet control functions that may be associated with a service provider, for example.

In one embodiment, each of the UEs 106A-106N may be representative of a device with wireless network connectivity such as a mobile phone, a hand-held device, a computer or a tablet, or virtually any type of wireless device. As described further below, the UE 106 may include at least one processor (shown in FIG. 2) that is configured to execute program instructions stored in a memory (also shown in FIG. 2). Accordingly, in some embodiments, the UE 106 may perform one or more portions of the functionality described below by executing such stored instructions. However, in other embodiments, the UE 106 may include one or more hardware elements and/or one or more programmable hardware elements such as an FPGA (field-programmable gate array) that may be configured to perform the one or more portions the functionality described below. In still other embodiments, any combination of hardware and software may be implemented to perform the functionality described below.

As described further below in conjunction with the descriptions of FIG. 2 through FIG. 4, in some embodiments, when the UE 106 is either attempting to initiate a PDN data session or "data call" with the network 100 or the data call is in progress, the UE 106 may be configured to respond in a particular way to a termination request from the network 100 that includes a specific termination cause code. More particularly, the UE 106 may initiate a PDN data session using, for example, a VSNCP point-to-point (PPP) procedure. The VSNCP procedures include a number of procedures to bring up, tear down, and reconfigure data calls, among other things. This VSNCP mechanism allows the UE 106, which may be camped or listening on the eHRPD system, to originate a data call using an access point name (APN). This may allow the UE 106 to roam on an LTE network, in the event that an Inter-radio access technology (I-RAT) handover procedure becomes necessary. A disconnection of a PDN connection or data call may be initiated by the UE 106 or by the network 100. The network 100 may terminate the data call for a variety of reasons. Accordingly, as described further below, the network 100 may send to the UE 106 a termination request that includes a specific termination cause code (shown in Table 1 below). The UE 106 may determine a specific response that corresponds to the specific termination cause code, and then perform one or more operations, including sending a termination acknowledgement to the network 100. In one embodiment, the UE 106 may automatically, and without user intervention, determine the specific response, initiate the appropriate actions. It is noted that in one embodiment, the network 100 may implement the eHRPD wireless communication standard as specified in the latest revision of the 3GPP2 X.S0057-0 specification.

Figure 2:
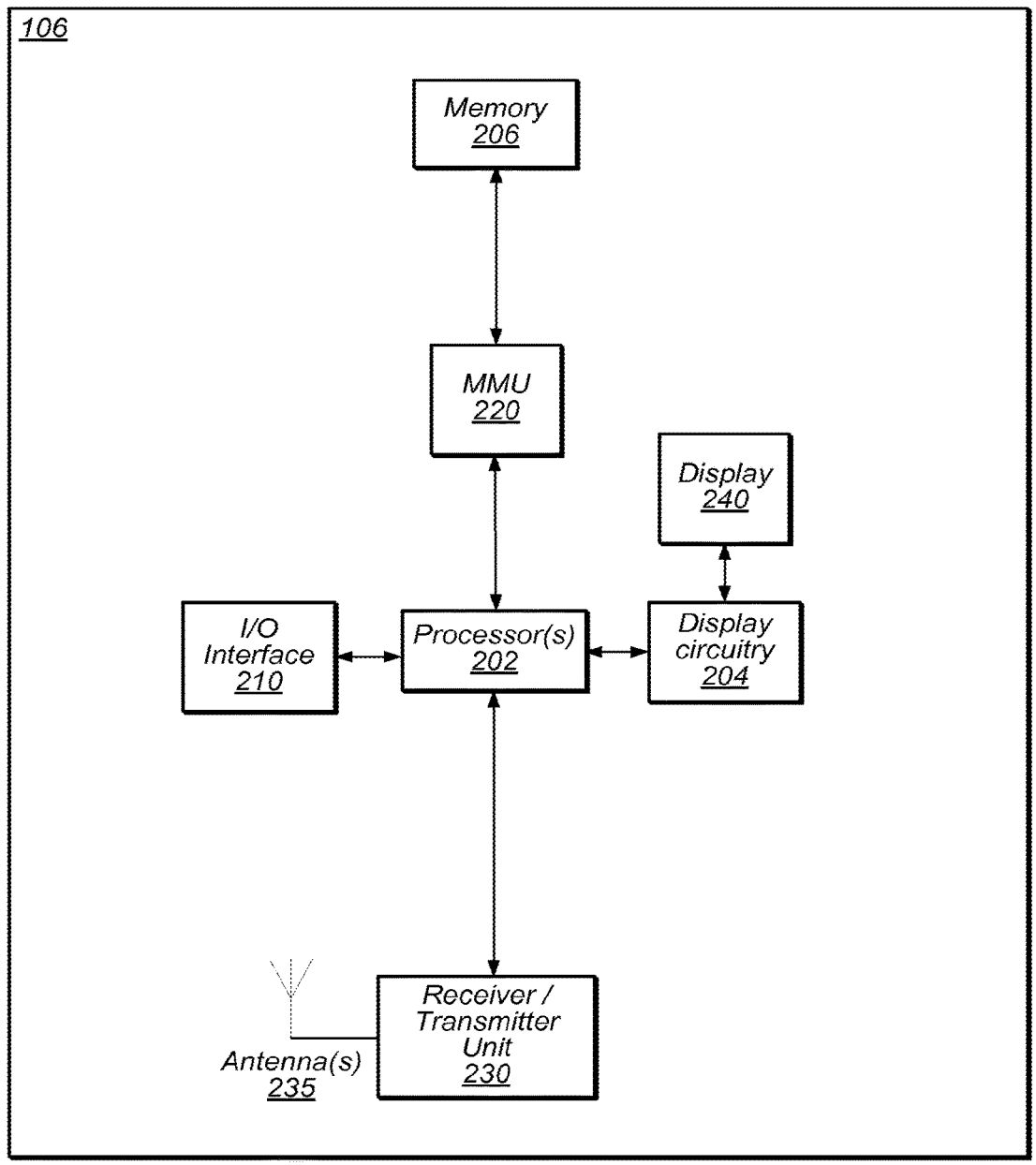
FIG. 2 is a block diagram of one embodiment of a wireless communication device shown in FIG. 1.

Referring to FIG. 2, a block diagram of one embodiment of a user equipment device shown in FIG. 1 is shown. It is noted that components that correspond to components shown in FIG. 1 are numbered identically for clarity and simplicity. The UE 106 includes processor(s) 202 (or processor core(s) 202) which is coupled to display circuitry 204 which is in turn coupled to the display 240. The processor(s) 202 is also coupled to a memory management unit (MMU) 220 and to a receiver/transmitter (R/T) unit 230. The MMU 220 is coupled to a memory 206. The UE 106 also includes an I/O interface 210 that is coupled to the processor(s) 202, and may be used for coupling the UE 106 to a computer system, or other external device. It is noted that in one embodiment the components shown within UE 106 of FIG. 2 may be manufactured as stand alone components. However, it is contemplated that in other embodiments various ones of the components may be part of one or more chipsets, or they may be part of a system on chip (SOC) implementation.

In various embodiments, the processors 202 may be representative of a number of different types of processors that may be found in a wireless communications device. For example, processor(s) 202 may include general processing capability, digital signal processing capability, as well as hardware accelerator functionality, as desired. The processor(s) 202 may include baseband processing and therefore may digitally process the signals received by the R/T unit 230. The processor(s) 202 may also process data that may be transmitted by the R/T unit 230. The processor(s) 202 may also perform a number of other data processing function such as running operating system and user applications for the UE 106.

In one embodiment, the MMU 220 may be configured to receive addresses from the processor(s) 202 and to translate those addresses to locations in memory (e.g., memory 206) and/or to other circuits or devices, such as the display circuitry 204, R/T unit 230, and/or display 240. The MMU 220 may also return data to the processor(s) 202 from the locations in memory 206. The MMU 220 may be configured to perform memory protection and page table translation or set up. In some embodiments, the MMU 220 may be included as a portion of the processor(s) 202. The display circuit 204 may be configured to perform graphics processing and provide display signals to the display 240.

The R/T unit 230 may, in one embodiment, include analog radio frequency (RF) circuitry for receiving and transmitting RF signals via the antenna 235 to perform the wireless communication. The R/T unit 230 may also include down-conversion circuitry to lower the incoming RF signals to the baseband or intermediate frequency (IF) as desired. For example, the R/T unit 230 may include various RF and IF filters, local oscillators, mixers, and the like. Since the UE 106 may operate according to a number of radio access technologies, the R/T unit 230 may include a corresponding number of RF front end portions to receive and down-convert, as well as up-convert and transmit the respective RF signals of each technology.

In various embodiments, the processor(s) 202 may execute software stored within a memory such as memory 206, for example, to perform functionality associated with responding to a termination request as mentioned above. In other embodiments however, the UE 106 may include hardware associated with the processor(s) 202 and/or the R/T 230 to perform functionality associated with responding to a termination request as mentioned above. In still other embodiments, the UE 106 may include any suitable combination of hardware, firmware and/or software to perform functionality associated with responding to a termination request as mentioned above, and described further below in conjunction with the description of FIG. 3 through FIG. 6.

In FIG. 3, a diagram of one embodiment of a VSNCP packet is shown. The VSNCP packet 300 includes a number of fields. As shown in the legend of FIG. 3, the code field may indicate what type of packet is being conveyed. In particular, a code of five corresponds to a VSNCP terminate-request. The identifier field may include an identifier that is used in matching requests and replies. The length field identifies the length of the packet in octets. The OUI field is an organizationally unique identifier that may identify a specific vendor. The data field may include zero or more configuration options. More particularly, there are a number of configuration options including PDN identifier, APN, PDN type, PDN address, Error/Cause Code, and attach type, among others.

As described briefly above, either the UE 106 or the network 100 may initiate such a packet. For embodiments in which the network 100 issues a VSNCP terminate-request packet, the data field of the packet includes a configuration option that identifies a termination cause code. It is noted that there are a number of termination options. For termination request packets, cause codes may be used that identify the cause of the termination request. Some example termination cause codes are shown in Table 1 below. Similarly, configure-reject packets may also include cause codes in addition to the error codes that may already be sent. More particularly, there may be vendor or operator-specific cause codes that may be sent that are particular to a given operator agreement, for example. These cause codes may enable the UE 106 to determine with some certainty the reason for the termination or configure rejection, thereby allowing the UE 106 to more efficiently utilize its resources to either re-establish a PDN connection or give up on the PDN connection.

TABLE 1

Example eHRPD Termination Cause Codes

| Value | Description |
|---|---|
| 0 | Insufficient Resources |
| 1 | Network Congestion |
| 2 | Service Option temporarily out of order |
| 3 | Subscriber has run out of prepaid data |
| 4 | Network Failure |
| 5 | Network dormancy timer expired |
| 6 | Regular teardown |
| 7 | General Error |
| 8 | PDN Limit Exceeded - Number of connections for this PDN has exceeded the maximum allowed limit |
| 9 | Device dormancy timer expired |
| 10 | Admin prohibited |

Figure 4:
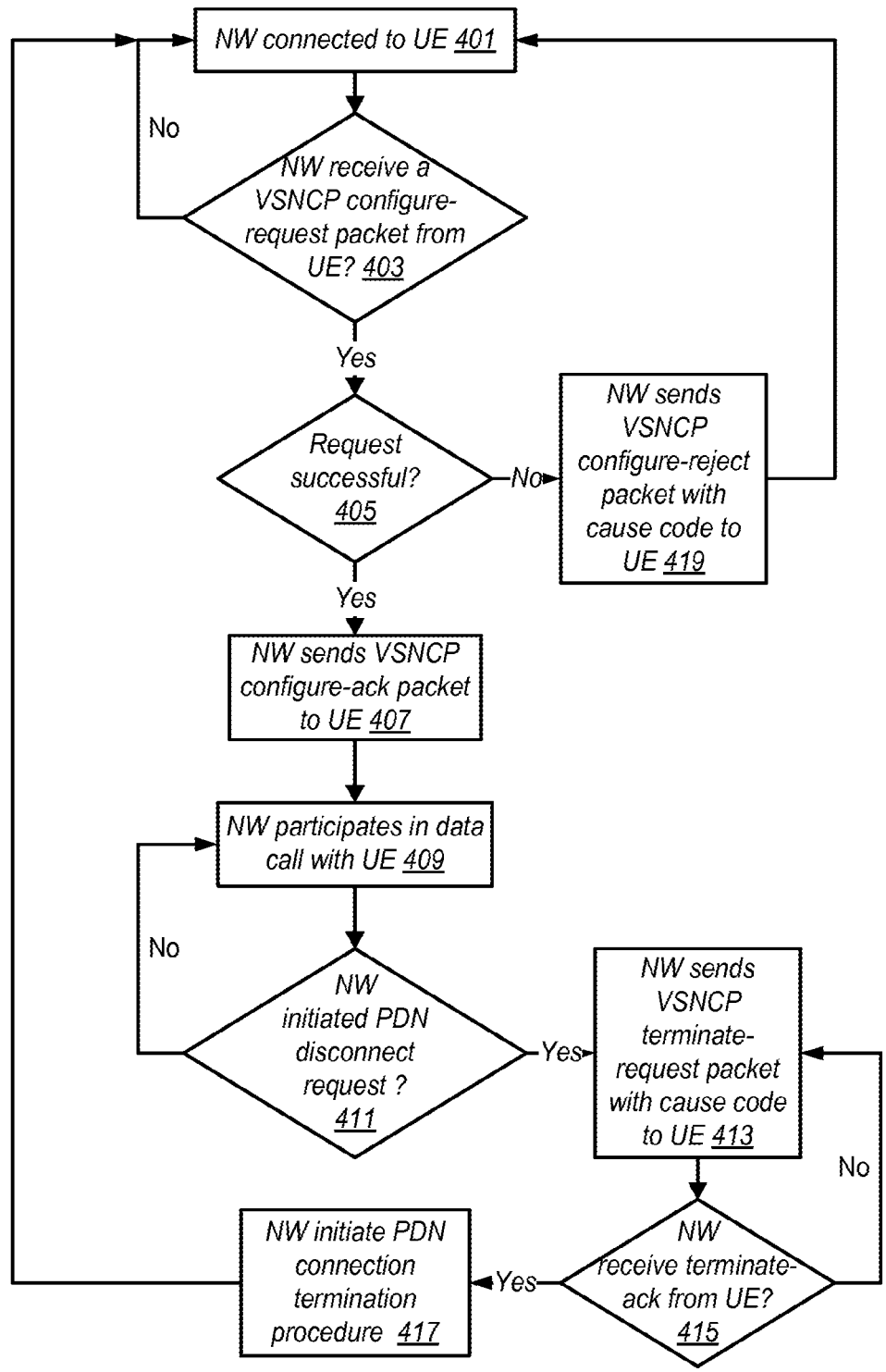
FIG. 4 is a flow diagram depicting the operation of one embodiment of the wireless network shown in FIG. 1.

In FIG. 4, a flow diagram depicting the operation of one embodiment of the network equipment of FIG. 1 is shown. Referring collectively to FIG. 1, FIG. 3, and FIG. 4 and beginning in block 401 of FIG. 4, a wireless network 100 (e.g., NW in FIG. 4) using, for example, the eHRPD protocol may be connected to the UE 106 via a PPP connection. More particularly, in one embodiment the UE 106 may be camped on the connection. Generally, a wireless mobile device such as UE 106 may be considered to be camping on a connection when the mobile device is listening or monitoring one or more control channels and is not transmitting, except as required by the network.

At some point, the network 100 may receive a VSNCP configure-request packet at the HSGW of the network 100 via the base station 102 (block 403). More particularly, in one embodiment, a user or an application executing on the UE 106 may initiate a PDN connection (IP) request to an APN of the network 100. If the request is not successful (block 405), the network 100 may send a VSNCP configure-reject packet to the UE 106. In one embodiment, the network 100 may include error codes and/or cause codes in the VSNCP configure-reject packet to enable the UE 106 to determine a best course of action to resolve the problem. Operation proceeds as described above in conjunction with the description of block 401.

However, if the request is successful (block 405), the network 100 may send a VSNCP configure-ack packet to the UE 106 (block 407), and the network 100 participates in the PDN connection with the UE 106 (block 409). During the data call, either the UE 106 or the network 100 may terminate the PDN connection. Accordingly, if the network 100 initiates the termination (block 411), the network 100 may send a VSNCP terminate-request packet including one or more cause codes such as the cause codes shown in Table 1, for example, to the UE 106 (block 413). In one embodiment, the network 100 may continue sending VSNCP terminate-request packets until the network 100 receives a terminate-ack packet from the UE 106 (block 415). Once the network 100 receives the terminate-ack packet, the network 100 may initiate a PDN connection termination (i.e., tear down) procedure. If the PPP link is still active, operation proceeds as described above in conjunction with the description of block 401.

Figure 5:
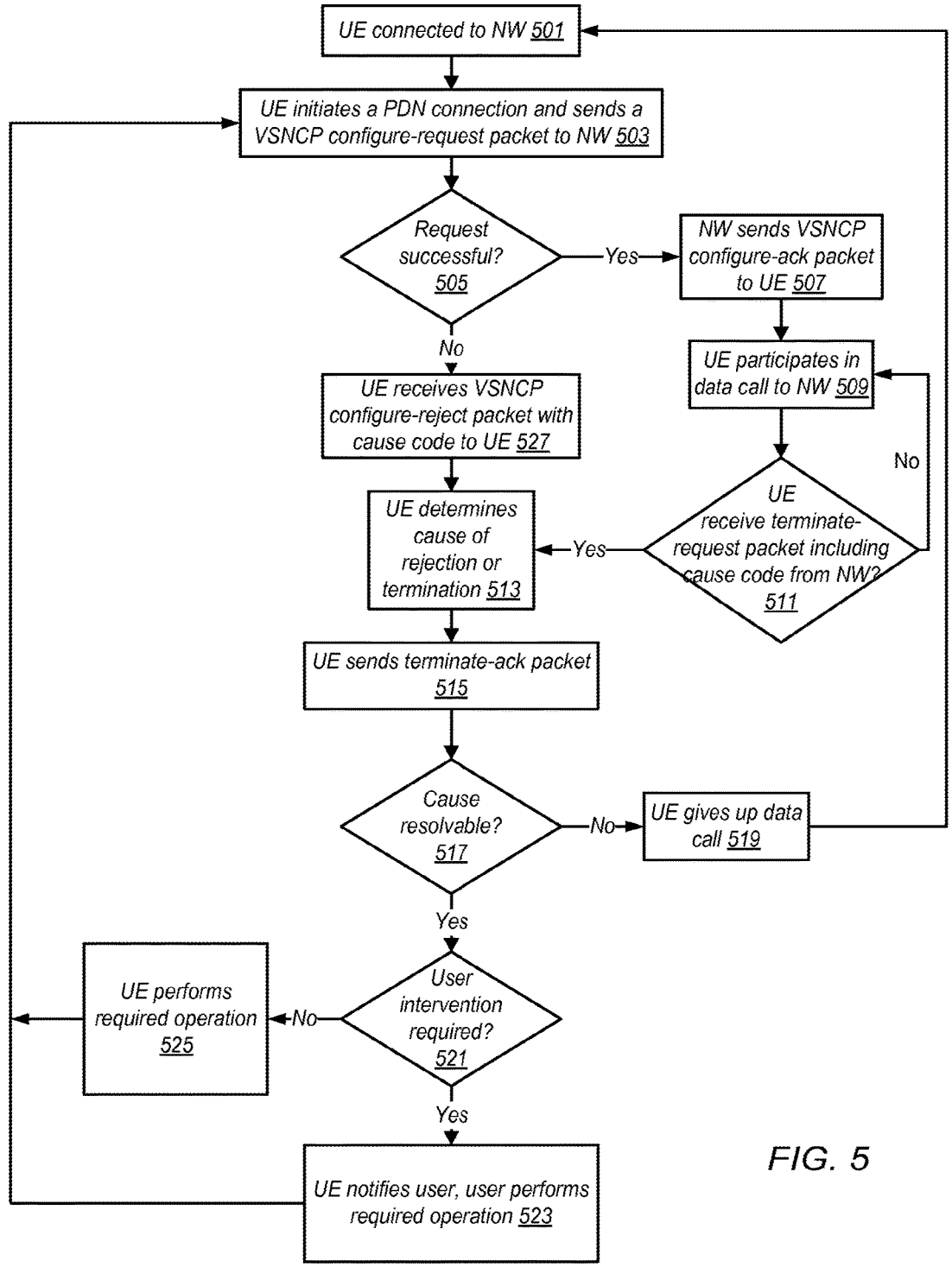
FIG. 5 is a flow diagram depicting the operation of one embodiment of the wireless communication device shown in FIG. 1 and FIG. 2.
Figure 6:
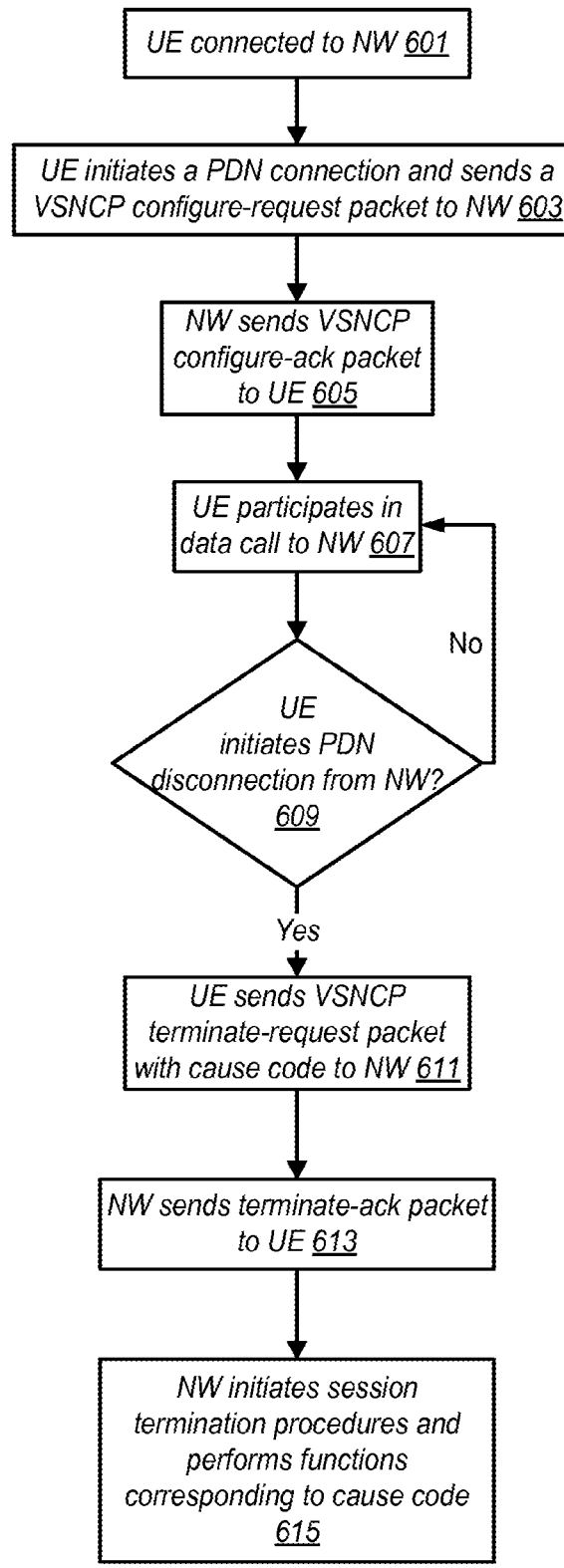
FIG. 6 a flow diagram depicting the operation of another embodiment of the wireless communication device shown in FIG. 1 and FIG. 2.

In FIG. 5, a flow diagram depicting the operation of one embodiment of the wireless user equipment device of FIG. 1 and FIG. 2 is shown. Referring collectively to FIG. 1 through FIG. 3, and FIG. 5 and beginning in block 501 of FIG. 5, the UE 106 may be connected via a PPP connection to a wireless network (e.g., NW) using, for example, the eHRPD protocol. More particularly, in one embodiment the UE 106 may be camped on the connection as described above.

At some point, a user or an application executing on the UE 106 may initiate a PDN connection (IP) request to an APN of the network 100 by sending a VSNCP configure-request packet to the HSGW of the network 100 via the base station 102 (block 503). If the request is successful (block 505), the network 100 sends a VSNCP configure-ack packet to the UE 106 (block 507). It is noted that the network 100 may send an additional VSNCP configure-request packet to the UE 106 to request additional configuration information. When the network 100 receives a second VSNCP configure-ack packet, the network 100 may complete IP (v4 or v6) address allocation. The UE 106 may then participate in the PDN data call through the network 100 (block 509).

While on the data call, the network 100 may initiate a PDN disconnection procedure. If the UE 106 receives a terminate-request packet from the network 100 (block 511) the UE 106 may try to determine the cause of the termination request, based upon the cause code included in the packet (block 513). More particularly, in one embodiment, depending on which entity of the network 100 initiated the termination, the termination cause may be different. For example, the Authentication, Authorization, Accounting/Home Subscriber Server AAA/HSS may initiate the termination request for a variety of reasons such as the user subscription is invalid, the subscription has run out of funds, or there is an authentication time out. In addition to the AAA/HSS, the P-GW may initiate the request, or the HSGW may initiate the request if, for example, the associated PPP session has terminated. It is noted that there may be many additional reasons. Accordingly, there may be a number of general cause codes, as well as operator and vendor specific cause codes. Once the UE 106 determines the cause of the termination, the UE 1067 may send a terminate-ack packet to the network 100 (block 515). It is noted that in other embodiments, the UE 106 may send the terminate-ack packet immediately and prior to determining the cause.

The UE 106 may determine whether or not the termination cause is resolvable (block 517). More particularly, in some cases, the termination cause may not be resolvable such as the case when the PPP connection is dropped, for example. In such cases, the UE 106 may give up the call and forego any retry of the PDN data call (block 519). In one embodiment, the UE 106 may notify the user via any of a variety of alerts and/or notification mechanisms. Operation may then proceed as described above in conjunction with the description of block 501. However, if the termination cause is resolvable (block 517), the UE 106 determines whether user intervention is required. If user intervention is not required (block 521), the UE 106 may perform any necessary operations and then attempts to re-initialize the PDN connection (block 525). More particularly, in one embodiment, if the user has run out of data according to their subscription plan, the terminate-request packet may have included a cause code that indicates, for example, "no user data usage remaining" The UE 106 may launch an application that includes predetermined user configuration and preferences. The application may automatically access and replenish the user's subscription account, based on these preferences and configuration data. Accordingly, depending upon the specific cause codes received, the UE 106 may respond in an appropriate way, and in an automated fashion. Thus, once the operations are performed to resolve the issue, the UE 106 may reinitiate the PDN connection as described above in conjunction with the description of block 503.

Referring back to block 521, if user intervention is required to resolve the issue, the UE 106 may notify the user through an onscreen alert or other notification mechanism. The user may then perform any necessary operations and then attempt to re-initialize the PDN connection (block 523). Once the operations are performed to resolve the issue, the UE 106 may reinitiate the PDN connection as described above in conjunction with the description of block 503.

Referring back to block 505, if the request is not successful, the UE 106 may receive a VSNCP configure-reject packet from the network 100 (block 527). In one embodiment, the configure-reject packet may include error codes and cause codes that identify the reason for the rejection. As described above in conjunction with the description beginning at block 513, the UE 106 may determine the cause of the rejection, and then determine whether it is a resolvable issue, etc.

Accordingly, when a network such as network 100 provides cause codes in the VSNCP terminate-request packets and configure-reject packets, the UE 106 may be able to respond in a proactive way to re-establish a PDN connection in less time, or to at least know with some certainty that the PDN connection should be abandoned.

As mentioned above, the UE 106 may also initiate a PDN disconnection request. Accordingly, in one embodiment, the UE 106 may include a cause code in the termination request. In FIG. 6, a flow diagram depicting the operation of another embodiment of the wireless communication device of FIG. 1 and FIG. 2 is shown. Referring collectively to FIG. 1 through FIG. 3, and FIG. 6 and beginning in block 601 of FIG. 6, the UE 106 may be connected via a PPP connection to a wireless network (e.g., NW) using, for example, the eHRPD protocol. More particularly, in one embodiment the UE 106 may be camped on the connection as described above.

At some point, a user or an application executing on the UE 106 may initiate a PDN connection (IP) request to an APN of the network 100 by sending a VSNCP configure-request packet to the HSGW of the network 100 via the base station 102 (block 603). If the request is successful, the network 100 sends a VSNCP configure-ack packet to the UE 106 (block 605). It is noted that the network 100 may send an additional VSNCP configure-request packet to the UE 106 to request additional configuration information. When the network 100 receives a second VSNCP configure-ack packet, the network 100 may complete IP (v4 or v6) address allocation. The UE 106 may then participate in the PDN data call through the network 100 (block 607).

While on the data call, the UE 106 may initiate a PDN disconnection procedure. If the UE 106 initiates the PDN disconnection (block 609), the UE 106 will send a terminate-request packet to the network 100 (block 611). More particularly, in one embodiment, the UE 106 may include a cause code in the termination request. In response the network 100 may send a terminate-ack packet (block 613). The network 100 may then initiate session termination procedures and perform various functions associated with the gateway's identity, APN and PDN connection. The network 100 may use the termination cause code during execution of the termination procedures.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
    a wireless transceiver configured to conform to an evolved high rate packet data (eHRPD) protocol;
    a network interface to a network operated by a particular vendor; and
    a processor configured to:
        communicate with a packet data network (PDN) via the network interface;
        communicate with a plurality of wireless devices via the wireless transceiver;
        send a first vendor specific network control protocol (VSNCP) packet to a first wireless device requesting a PDN disconnection, wherein the first VSNCP packet includes a first cause code that indicates a reason for the PDN disconnection request, and wherein the first cause code is particular to a first agreement with the particular vendor;
        send a second VSNCP packet to a second wireless device requesting a PDN disconnection, wherein the second VSNCP packet includes a second cause code, different than the first cause code, that indicates another reason for the PDN disconnection request, and wherein the second cause code is particular to a second agreement with the particular vendor; and
        resend the first VSNCP packet in response to a determination that the first wireless device did not respond with an acknowledgement packet.

2. The apparatus of claim 1, wherein the wireless transceiver is further configured to conform to a latest version of a $3^{rd}$ Generation Partnership Project 2 (3GPP2) X.S0057-0 specification.

3. The apparatus of claim 1, wherein the first VSNCP packet includes a VSNCP terminate-request packet.

4. The apparatus of claim 1, wherein the processor is further configured to receive a third VSNCP packet from the first wireless device in response to resending the first VSNCP packet, wherein the third VSNCP packet includes an acknowledgement of the PDN disconnection request.

5. The apparatus of claim 4, wherein the processor is further configured to receive a fourth VSNCP packet from the first wireless device in response to receiving the third VSNCP packet, wherein the fourth VSNCP packet includes a PDN connection request.

6. The apparatus of claim 1, wherein the first cause code includes an indication that an account associated with the first wireless device has reached a data usage limit.

7. The apparatus of claim 1, wherein the first cause code includes an indication that a network dormancy timer has expired.

8. A method comprising:
    communicating with a packet data network (PDN) operated by a particular vendor;
    communicating with a plurality of wireless devices via an evolved high rate packet data (eHRPD) interface;
    receiving a first vendor specific network control protocol (VSNCP) packet from a first wireless device, wherein the first VSNCP packet includes a PDN disconnection request and a first cause code, wherein the first cause code indicates a reason for the PDN disconnection request, wherein the first cause code is particular to a first agreement with the particular vendor;
    receiving a second VSNCP packet from a second wireless device, wherein the second VSNCP packet includes a PDN disconnection request and a second cause code, different than the first cause code, wherein the second cause code is particular to a second agreement with the particular vendor;
    sending a third VSNCP packet to the first wireless device in response to receiving the first VSNCP packet, wherein the third VSNCP packet includes an acknowledgement of the PDN disconnection request; and
    initiating, dependent upon the first cause code, a session termination procedure with the first wireless device.

9. The method of claim 8, wherein the eHRPD interface conforms to a latest version of a $3^{rd}$ Generation Partnership Project 2 (3GPP2) X.S0057-0 specification.

10. The method of claim 8, wherein the first VSNCP packet includes a VSNCP terminate-request packet.

11. The method of claim 8, further comprising receiving a fourth VSNCP packet from the first wireless device, wherein the fourth VSNCP packet includes a PDN connection request.

12. The method of claim 8, wherein the first cause code includes an indication that the first wireless device has insufficient resources to continue a connection.

13. The method of claim 8, wherein the first cause code includes an indication that an account associated with the first wireless device has reached a data usage limit.

14. The method of claim 8, wherein the first cause code includes an indication that a dormancy timer has expired in the first wireless device.

15. An apparatus comprising:
    a wireless transceiver configured to conform to an evolved high rate packet data (eHRPD) protocol;
    a network interface to a network operated by a particular vendor; and
    a processor configured to:
        communicate with a packet data network (PDN) via the network interface;
        communicate with a plurality of wireless devices via the wireless transceiver;
        receive a first vendor specific network control protocol (VSNCP) packet from a first wireless device requesting a PDN disconnection, wherein the first VSNCP packet includes a first cause code that indicates a reason for the PDN disconnection request, and wherein the first cause code is particular to a first agreement with the particular vendor;
        receive a second VSNCP packet from a second wireless device requesting a PDN disconnection, wherein the second VSNCP packet includes a second cause code, different than the first cause code, that indicates another reason for the PDN disconnection request, and wherein the second cause code is particular to a second agreement with the particular vendor;

send a third VSNCP packet to the first wireless device in response to receiving the first VSNCP packet, wherein the third VSNCP packet includes an acknowledgement of the PDN disconnection request; and initiate, dependent upon the first cause code, a session termination procedure with the first wireless device.

16. The apparatus of claim 15, wherein the wireless transceiver is further configured to conform to a latest version of a $3^{rd}$ Generation Partnership Project 2 (3GPP2) X.S0057-0 specification.

17. The apparatus of claim 15, wherein the first VSNCP packet includes a VSNCP terminate-request packet.

18. The apparatus of claim 15, wherein the processor is further configured to receive a fourth VSNCP packet from the first wireless device, wherein the fourth VSNCP packet includes a PDN connection request.

19. The apparatus of claim 15, wherein the first cause code includes an indication that the first wireless device has insufficient resources to continue a connection.

20. The apparatus of claim 15, wherein the first cause code includes an indication that a dormancy timer has expired in the first wireless device.

* * * * *